US006168092B1

(12) United States Patent
Schneider

(10) Patent No.: US 6,168,092 B1
(45) Date of Patent: Jan. 2, 2001

(54) FENCE SPRINKLER SYSTEM

(76) Inventor: Mark L. Schneider, 2515 Summit Dr., Cheyenne, WY (US) 82009

(*) Notice: Under 35 U.S.C. 154(b), the term of this patent shall be extended for 0 days.

(21) Appl. No.: 09/441,826

(22) Filed: Nov. 17, 1999

(51) Int. Cl.7 .............................. B05B 15/10; B05B 15/06
(52) U.S. Cl. ........................... 239/203; 239/276; 239/289
(58) Field of Search .................................... 239/200, 201, 239/203–206, 273, 275, 276, 279, 289

(56) References Cited

U.S. PATENT DOCUMENTS 2,940,466 * 6/1960 Speights ........................... 239/289 X
3,425,630 * 2/1969 Fessler, Sr. ...................... 239/289 X
3,865,309 * 2/1975 Greenhalgh ...................... 239/289 X
3,875,699 * 4/1975 Lamarre ........................... 239/276 X
3,933,311 * 1/1976 Lemelson ......................... 239/289 X
5,967,416 * 10/1999 Barbour ............................... 239/205

FOREIGN PATENT DOCUMENTS

324012 * 1/1930 (GB) .................................... 239/289

* cited by examiner

*Primary Examiner*—Lesley D. Morris
(74) *Attorney, Agent, or Firm*—Dean P. Edmundson

(57) ABSTRACT

A fence sprinkler system is described in which tubular posts include an interior cavity, a water line extends upwardly through the cavity, and a sprinkling unit is connected to the water line at the upper end of each post. The sprinkling unit can be recessed into the upper end of the post, and a cap is attached to the top of the sprinkling unit to close the upper end of the post when the sprinkling head is retracted into the post.

9 Claims, 2 Drawing Sheets

FENCE SPRINKLER SYSTEM

FIELD OF THE INVENTION

This invention relates to water sprinkling systems. More particularly, this invention relates to systems for incorporating a water sprinkler into a fence to sprinkle water over an area adjacent to the fence.

BACKGROUND OF THE INVENTION

Water sprinkling systems have been known and used for a long time. However, existing sprinkler systems are not always suitable or efficient for applying water in certain situations or in certain areas. For example, some areas are too large to be efficiently or practically watered using a hose connected to a conventional lawn sprinkler. Also, pastures for livestock normally cannot be watered with conventional sprinklers because the animals could damage the sprinklers. It is also possible for the animals to be injured when coming into contact with the sprinklers.

There has not heretofore been provided a sprinkler system having the features and advantages provided by the present invention.

SUMMARY OF THE INVENTION

In accordance with the present invention there is provided a sprinkler system which is supported by and integral with a fence. In a preferred embodiment, the fence sprinkling system comprises:

(a) a plurality of upright tubular post members having upper and lower ends and an interior cavity;

(b) a water line supplying a source of pressurized water, wherein the water line extends upwardly through the interior cavity in each post member; and (c) a sprinkling unit connected to the water line at the upper end of each post member.

The sprinkling system of the invention provides several advantages over existing sprinkler systems. For example, the system of the invention avoids the need for running hoses or sprinkler lines through the middle of pastures or other areas to be watered. It also avoids the need for installing posts in the middle of the area to be watered. The presence of ground level sprinkler systems in pastures and paddocks can lead to injuries to livestock, and livestock can cause damage to the sprinkler system. Such problems can be avoided with the system of this invention.

Other features and advantages of the fence sprinkler system of the invention will be apparent from the following detailed description and the accompanying drawings.

BRIEF DESCRIPTION OF THE DRAWINGS

The invention is described in more detail hereinafter with reference to the accompanying drawings wherein.

DETAILED DESCRIPTION OF THE INVENTION

Figure 1:
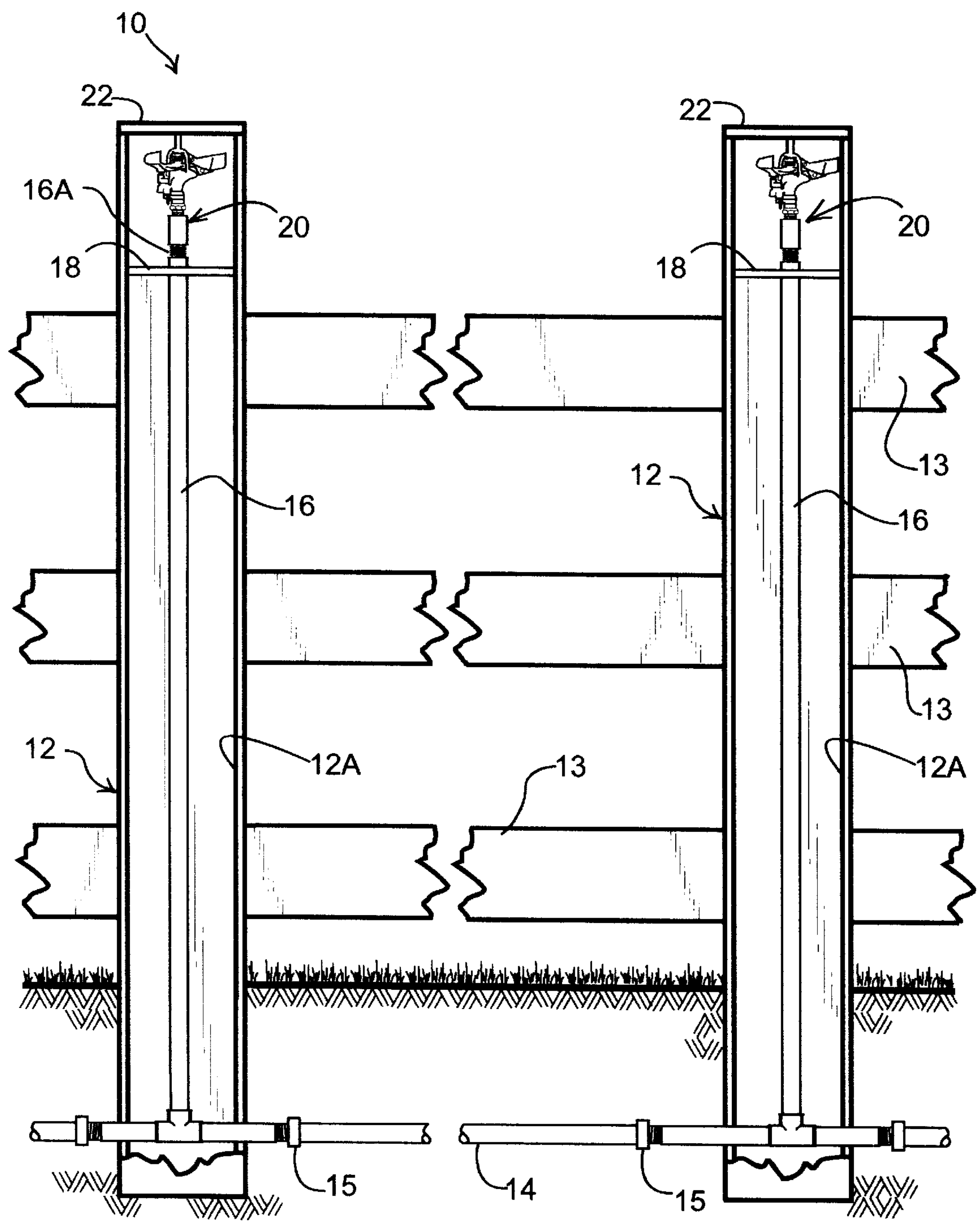
FIG. 1 shows a side elevational view, partially cut-away, of a preferred embodiment of a fence sprinkler system of the invention.

In FIG. 1 there is shown a preferred embodiment of a fence sprinkler system 10 of the invention comprising a plurality of upright tubular post members 12 having upper and lower ends. The lower ends are secured below ground level.

Each post member is hollow or includes an interior cavity 12A. Such post members are preferably composed of durable plastic such as PVC or the like. The posts can have a square or circular cross-section. Horizontal rail members 13 are secured to the posts to form an appropriate fence around or along the area to be watered.

A water supply line 14 runs below ground level to supply pressurized water to the location of each post. Couplers 15 connect the water line to water line 16 extending upwardly through the interior cavity 12A in each post, as shown. A plate member or disk 18 is secured inside each post near its upper end to secure the upper end of water line 16 and hold it in a fixed position.

Because the upper end 16A of each water line is threaded, a sprinkler head 20 can be threadably attached to the upper end of the water line within the recess at the upper end of each post. A cap member 22 is mounted on the top of the sprinkler head to close the interior recess or cavity in the upper end of the post when water is not passing through the sprinkler head.

The sprinkler head 20 is a pop-up sprinkler which is caused to extend upwardly past the top of the post when water passes through the water line to the head. When the water is turned off, the sprinkler head automatically retracts into the recess in the upper end of the post where it is out of sight and where it is protected from the elements and from any livestock around the fence. Preferably, the sprinkler head is a rotating sprinkler which rotates completely or oscillates back and forth to water the selected area.

Figure 2:
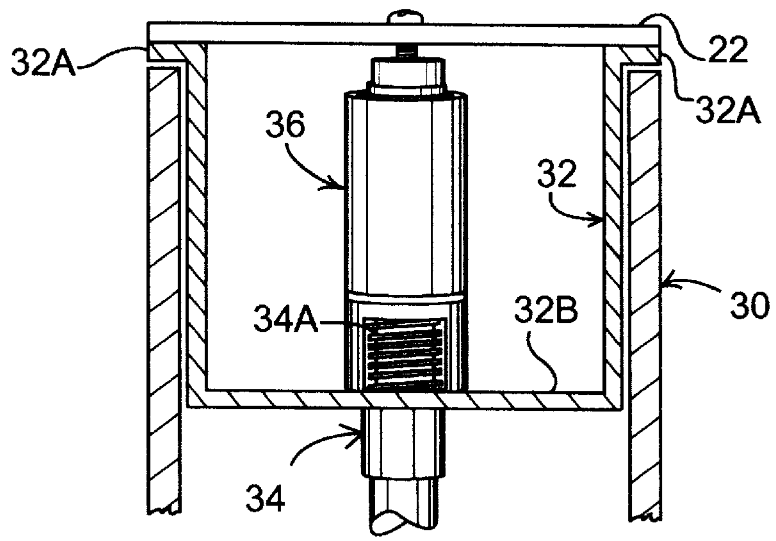
FIG. 2 is a cut-away view showing the upper end of a post with a sleeve member installed therein.

FIG. 2 shows the upper end of a post member 30 in which a tubular sleeve 32 is slidably received. The upper end of the sleeve includes a flange 32A which has a diameter greater than the diameter of the post so that the flange rests on, and is supported by, the upper end of the post. The sleeve includes a floor or bottom 32B in which a fitting or coupler 34 is secured. The upper end 34A of the coupling 34 extends into the sleeve and a sprinkler 36 can be threadably secured to it. A cap 22 is attached to the top of the sprinkler. The water supply line can be attached to the lower end of the coupling.

Figure 3:
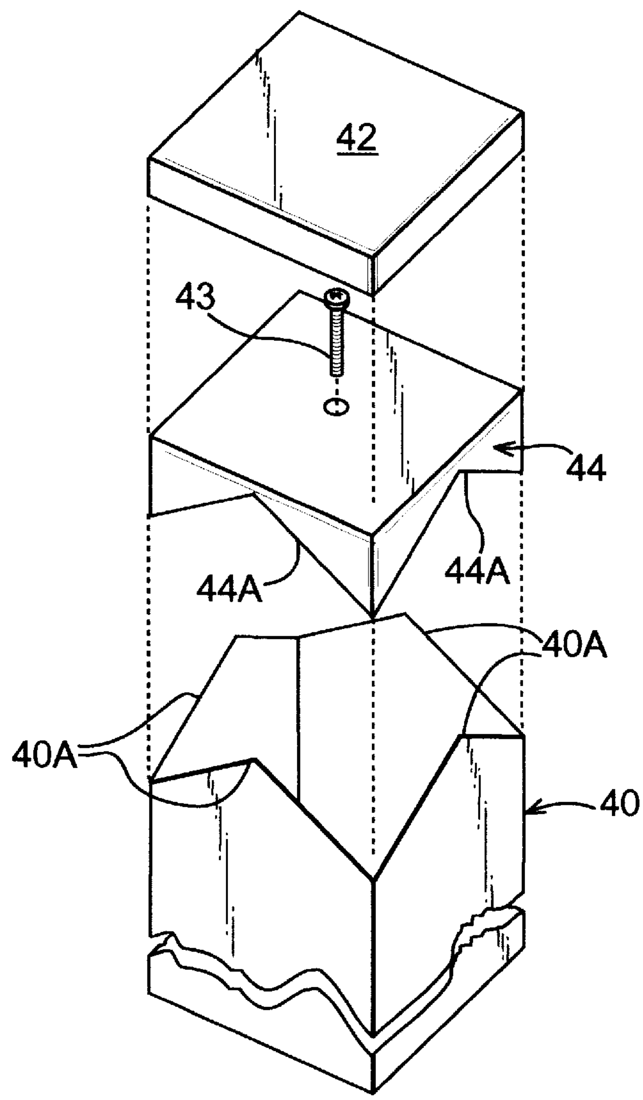
FIG. 3 is an explosion view showing another embodiment of a post member which is useful in the present invention.

FIG. 3 is an explosion view of another embodiment of a post member 40 which has a square cross-section. The wall members at the upper end of the post have been cut or shaped to provide inverted V-shaped projections 40A. The cap member 42 is secured to the upper side of an adaptor 44 which has four sides (each of which includes an inverted V-shaped notch 44A). A bolt or screw 43 extends through the adaptor to secure the cap and adaptor to the upper end of a sprinkler unit housed within the post. This type of cap arrangement for a square post assures that the cap will properly align with and enclose the opening at the upper end of the post when the sprinkler unit is turned off. When the sprinkler unit retracts into the post, the cap will self-align on the upper end of the post due to the sloped walls of the post and the cap with attached adaptor. The depth of cut of the notches 44A in adaptor 44 is equal to the height of the corresponding projections 40A on the top of the post so that when the cap and adaptor are in the lowered position, the adaptor notches will mate with the projections on the top of the post.

Other variants are possible without departing from the scope of this invention. For example, it is possible to use the sprinkler system in conjunction with a single post member, or multiple post members, in an area to be watered, without including rail members between or otherwise connected to the post(s). It is also possible to use the system of this invention without using pop-up type sprinkler heads. It is also possible to attach the water supply line to the backside of the horizontal fence rails and then extend the line into the interior cavity of each post (through a side wall of the post) and then upwardly to the sprinkling unit. Other variants are also possible within the scope and spirit of the present invention.

What is claimed is:

1. A fence sprinkling system comprising:

(a) a plurality of upright tubular post members having upper and lower ends and an interior cavity; wherein said lower end of each said post member is secured in the ground;

(b) a water line supplying a source of pressurized water, wherein said water line extends upwardly through the interior cavity in each said post member;

(c) a sprinkling unit connected to said water line at said upper end of each said post member; wherein said sprinkling unit is recessed into said upper end of said post member; wherein said sprinkling unit comprises a pop-up sprinkler head; and (d) a cap member secured to said sprinkler head; wherein said cap member completely closes said upper end of said post member when said sprinkler head is retracted into said post.

2. The system of claim 1, wherein each said post member comprises a plastic post.

3. The system of claim 1, wherein each said post member has a square cross-section.

4. The system of claim 3, wherein said upper end of each said post member comprises side walls which each include an inverted V-shape, and wherein said cap member has a square cross-section and further includes four inverted V-shaped notches which are complementary to the upper end of one of said post members.

5. The system of claim 1, further comprising a riser tube extending upwardly through each said post member for supplying water to said sprinkling unit.

6. The system of claim 1, further comprising a sleeve member slidably received in said upper end of said post member.

7. The system of claim 6, wherein said sleeve member includes a flange member having a diameter greater than the diameter of said post member.

8. A fence sprinkling system comprising:

(a) a plurality of upright tubular post members having upper and lower ends and an interior cavity; and further comprising a sleeve member slidably received in said upper end of said post member;

(b) a water line supplying a source of pressurized water, wherein said water line extends upwardly through the interior cavity in each said post member; and (c) a sprinkling unit connected to said water line at said upper end of each said post member; wherein said sprinkling unit is recessed into said upper end of said post member.

9. The system of claim 8, wherein said sleeve member includes a flange member having a diameter greater than the diameter of said post member.

* * * * *